United States Patent
James et al.

(10) Patent No.: US 10,210,672 B2
(45) Date of Patent: Feb. 19, 2019

(54) SYSTEMS AND METHODS FOR REMOTELY CONTROLLING DATA COLLECTION BY A VEHICLE

(71) Applicant: Toyota Research Institute, Inc., Los Altos, CA (US)

(72) Inventors: Michael R. James, Northville, MI (US); Edwin B. Olson, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/481,818

(22) Filed: Apr. 7, 2017

(65) Prior Publication Data

US 2018/0293809 A1    Oct. 11, 2018

(51) Int. Cl.
| | | |
|---|---|---|
| G07C 5/08 | (2006.01) |
| G06F 3/06 | (2006.01) |
| B60R 16/02 | (2006.01) |
| H04W 4/70 | (2018.01) |
| G07C 5/00 | (2006.01) |
| H04L 29/08 | (2006.01) |
| B60R 16/023 | (2006.01) |

(52) U.S. Cl.
CPC .......... *G07C 5/008* (2013.01); *B60R 16/0232* (2013.01); *G06F 3/0605* (2013.01); *G07C 5/085* (2013.01); *H04L 67/025* (2013.01); *H04L 67/125* (2013.01); *H04W 4/70* (2018.02)

(58) Field of Classification Search
CPC ......... G07C 5/008; G07C 5/085; H04W 4/70; H04W 4/005; B60R 16/0232; H04L 67/125; H04L 67/025; G06F 3/0605
See application file for complete search history.

(56) References Cited

U.S. PATENT DOCUMENTS

| | | | |
|---|---|---|---|
| 9,000,903 B2 | 4/2015 | Bowers et al. | |
| 9,361,650 B2 | 6/2016 | Binion et al. | |
| 9,477,990 B1 | 10/2016 | Binion et al. | |
| 9,494,435 B2* | 11/2016 | Xu | G07C 5/0808 |
| 9,600,541 B2* | 3/2017 | Choi | G07C 5/008 |
| 9,767,624 B2* | 9/2017 | Bakfan | G07C 5/0841 |

(Continued)

OTHER PUBLICATIONS

CAS DataLoggers, printed on Mar. 27, 2017 from http://www.dataloggerinc.com/products/Influx_Secure_Streaming_Data_Management/216/ in 2 pages.

*Primary Examiner* — Tyler J Lee

(74) *Attorney, Agent, or Firm* — Christopher G. Darrow; Darrow Mustafa PC

(57) ABSTRACT

System, methods, and other embodiments described herein relate to controlling a vehicle to selectively collect event data. In one embodiment, a method includes, in response to receiving a collection request from a remote server, identifying defined parameters from the collection request about which data is to be harvested from the vehicle. The defined parameters include at least a content parameter that indicates criteria for determining which data associated with the vehicle is to be collected. The method includes collecting, from one or more vehicle systems of the vehicle, event data as a function of the content parameter and discarding extraneous data that does not match the content parameter. The method includes providing the event data to fulfill the collection request.

20 Claims, 4 Drawing Sheets

(56) References Cited

U.S. PATENT DOCUMENTS

| | | | |
|---|---|---|---|
| 2007/0027583 A1* | 2/2007 | Tamir | G06Q 30/0283 |
| | | | 701/1 |
| 2011/0196571 A1 | 8/2011 | Foladare et al. | |
| 2012/0209634 A1 | 8/2012 | Ling et al. | |
| 2012/0215446 A1* | 8/2012 | Schunder | G07C 5/008 |
| | | | 702/3 |
| 2013/0015982 A1* | 1/2013 | Matsumoto | G06Q 50/06 |
| | | | 340/870.02 |
| 2013/0302758 A1 | 11/2013 | Wright | |
| 2014/0002651 A1 | 1/2014 | Plante | |
| 2014/0025253 A1 | 1/2014 | Rybak et al. | |
| 2014/0058761 A1 | 2/2014 | Freiberger | |
| 2014/0358430 A1* | 12/2014 | Xu | G07C 5/0808 |
| | | | 701/461 |
| 2015/0317844 A1* | 11/2015 | Choi | G07C 5/008 |
| | | | 701/29.3 |
| 2015/0371457 A1* | 12/2015 | Bakfan | G07C 5/0841 |
| | | | 701/29.3 |
| 2016/0293000 A1* | 10/2016 | Torgerson | G08G 1/0112 |
| 2017/0277716 A1* | 9/2017 | Giurgiu | G06F 17/30241 |
| 2018/0059679 A1* | 3/2018 | Taimouri | G05D 1/0248 |

\* cited by examiner

SYSTEMS AND METHODS FOR REMOTELY CONTROLLING DATA COLLECTION BY A VEHICLE

TECHNICAL FIELD

The subject matter described herein relates in general to systems for collecting information from a vehicle and, more particularly, to remotely controlling which information is collected and reported by the vehicle.

BACKGROUND

As computing devices become integrated with different machines and aspects of daily living, more information also becomes available. By way of example, where previously information about operating characteristics of different vehicle systems may not have been available, now information is available from many different systems because of the integration of computing devices with the vehicle. However, coincident with the availability of information arises difficulties with managing the information. That is, as more information is collected, additional storage is needed for the information, which comes with associated costs both monetary and space-wise. Moreover, searching the large amounts of collected information for desired information can be computationally intensive.

SUMMARY

In one embodiment, example systems and methods relate to a manner of remotely controlling which data the vehicle collects. For example, in one embodiment, the vehicle is configured to receive instructions from a remote server about which data is to be collected and reported. Thus, when a particular type of data about, for example, a particular event or operation of a particular vehicle system is desired, a collection request is provided to the vehicle. The vehicle receives the collection request and configures one or more internal filters to selectively collect event data specified by the collection request while discarding other data. Subsequently, the vehicle can, for example, communicate the event data back to the requesting entity. In this way, collection of data can be focused to avoid excessive amounts of collected information that use extra storage and complicate identifying desired data.

In one embodiment, a collection system for collecting information from a vehicle is disclosed. The collection system includes one or more processors and a memory that is communicably coupled to the one or more processors. The memory stores a communication module that includes instructions that when executed by the one or more processors cause the one or more processors to, in response to receiving a collection request from a remote server, identify defined parameters from the collection request about which data is to be harvested from the vehicle. The defined parameters include at least a content parameter that indicates criteria for determining which data associated with the vehicle is to be collected. The memory stores a filter module including instructions that when executed by the one or more processors cause the one or more processors to collect, from one or more vehicle systems of the vehicle, event data as a function of the content parameter and discarding extraneous data that does not match the content parameter. The communication module includes instructions to provide the event data to fulfill the collection request.

In one embodiment, a non-transitory computer-readable medium is disclosed. The computer-readable medium stores instructions that when executed by one or more processors cause the one or more processors to perform the disclosed functions. The instructions include instructions to, in response to receiving a collection request from a remote server, identifying defined parameters from the collection request about which data is to be harvested from the vehicle. The defined parameters include at least a content parameter that indicates criteria for determining which data associated with the vehicle is to be collected. The instructions include instructions to collect, from one or more vehicle systems of the vehicle, event data as a function of the content parameter and discarding extraneous data that does not match the content parameter. The instructions include instructions to provide the event data to fulfill the collection request.

In one embodiment, a method of collecting information from a vehicle is disclosed. The method includes, in response to receiving a collection request from a remote server, identifying defined parameters from the collection request about which data is to be harvested from the vehicle. The defined parameters include at least a content parameter that indicates criteria for determining which data associated with the vehicle is to be collected. The method includes collecting, from one or more vehicle systems of the vehicle, event data as a function of the content parameter and discarding extraneous data that does not match the content parameter. The method includes providing the event data to fulfill the collection request.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with selectively collecting event data from a vehicle are disclosed. As mentioned previously, collecting information from a vehicle can be a complex task. In particular, isolating information from large amounts of available data that is generated by disparate systems and components can be complex. In general, this complexity may result from the vehicle generating large log files that indiscriminately include information without regard to a particular relevancy of that data. Thus, extraneous data is collected and stored among data that is pertinent to a particular event. Moreover, storing the data in this way can consume extra resources such as processing time and/or memory capacity. As an additional complexity, when information is to be collected from a plurality of vehicles, the complexity of isolating data about a particular event or component can be compounded because of a quantity of data that is to be searched/parsed to find the relevant data. Furthermore, when the data is not specifically labeled or otherwise marked the task can be further complicated.

Therefore, in one embodiment, a collection system targets particular data for collection that is relevant to, for example, a particular collection request while discarding extraneous data that does not relate to the collection request. Moreover, a centralized remote server or other authority can direct a multiplicity of vehicles to collect data according to defined parameters. In this way, data that is relevant to a particular purpose can be aggregated while avoiding difficulties associated with storing and parsing large data sets that include irrelevant data in addition to the relevant data.

Figure 1:
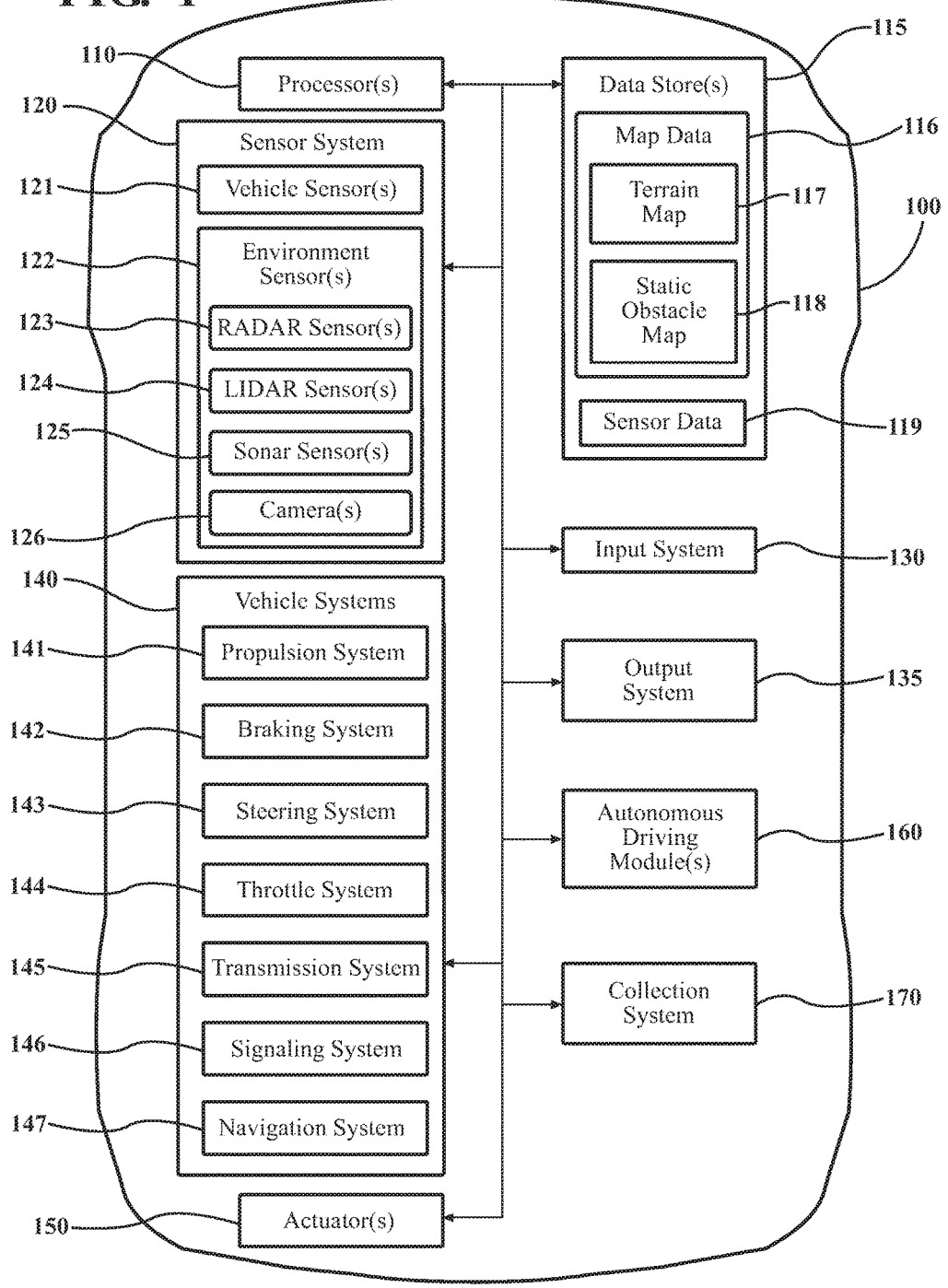
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from selectively collecting event data as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a collection system 170 that is implemented to perform methods and other functions as disclosed herein relating to selectively collecting event data within the vehicle 100 according to a collection request. The noted functions and methods will become more apparent with a further discussion of the figures.

Figure 2:
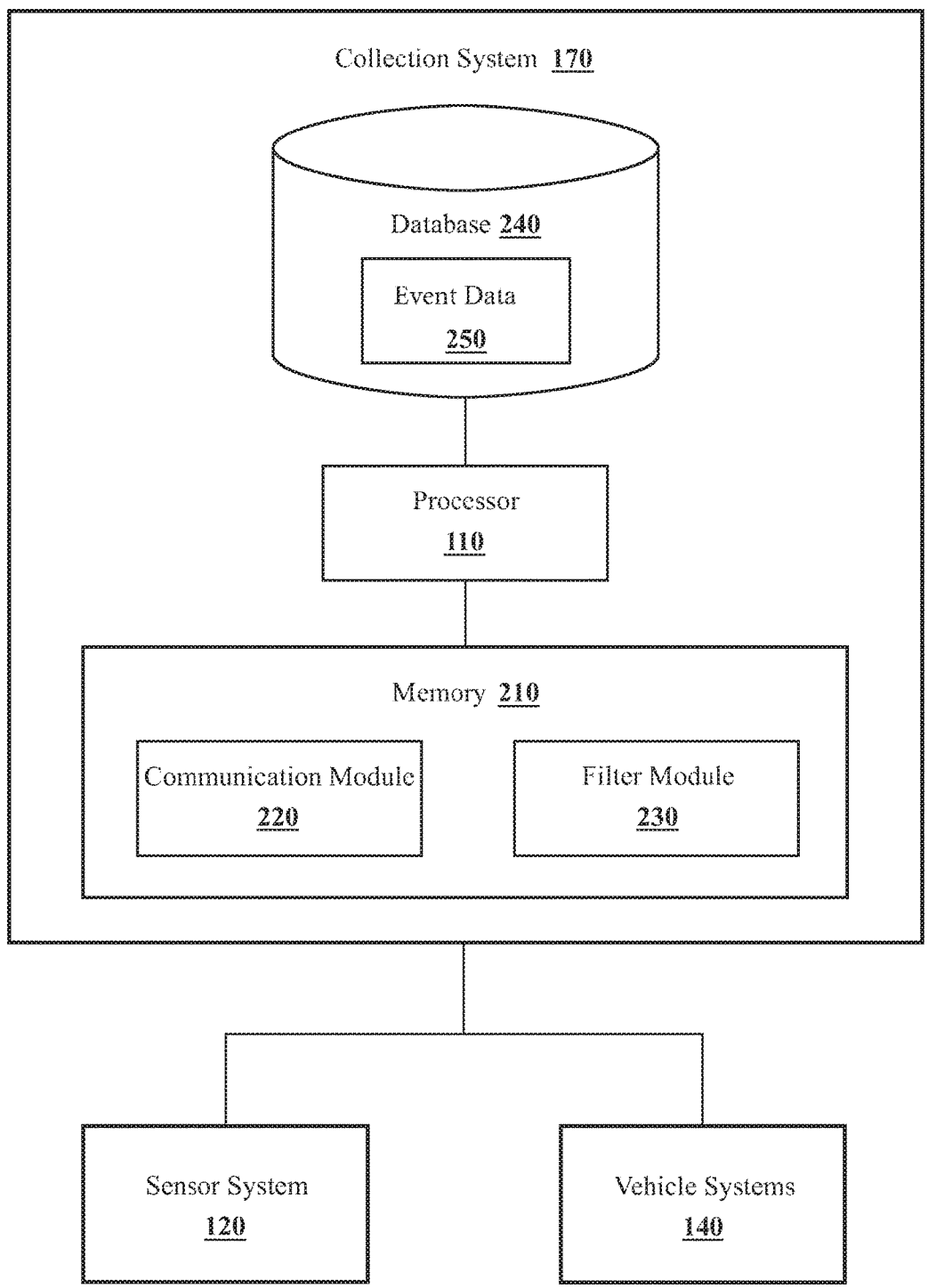
FIG. 2 illustrates one embodiment of a collection system that is associated with selectively collecting event data from a vehicle.

With reference to FIG. 2, one embodiment of the collection system 170 of FIG. 1 is further illustrated. The collection system 170 is shown as including a processor 110 from the vehicle 100 of FIG. 1. Accordingly, the processor 110 may be a part of the collection system 170, the collection system 170 may include a separate processor from the processor 110 of the vehicle 100, or the collection system 170 may access the processor 110 through a data bus or another communication path. In one embodiment, the collection system 170 includes a memory 210 that stores a communication module 220 and a filter module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the communication module 220 generally includes instructions that function to control the processor 110 to identify defined parameters that indicate which data is to be collected from the vehicle 100. In one implementation, the communication module 220 receives wireless communications through a wireless cellular connection or other communications link. By way of example, when an original equipment manufacturer (OEM) of the vehicle 100 wishes to collect information about a particular event, a remote server may generate a collection request that is communicated to the vehicle 100. The collection request can include defined parameters indicating, for example, a content parameter and a trigger event. The content parameter defines attributes of data that is to be collected. For example, the content parameter can indicate a source of data (e.g., a particular sensor), a type of data (e.g., particular errors, etc.), and so on. Additionally, the trigger event can indicate an occurrence of an event related to the vehicle 100 that causes the collection system 170 to initiate data collection. Thus, the trigger event can include a geospatial boundary, a particular action (e.g., degree of braking), a particular timeframe (e.g., night vs. day, specific time, etc.), and so on.

Moreover, a form of the collection request can include a self-extracting software package, an XML file populated with the defined parameters, or another suitable means of conveying the defined parameters. In either case, the communication module 220 can initially identify the defined parameters from a wireless communication or other message source (e.g., physically inserted flash drive) of the collection request by parsing communication to extract the defined parameters. Alternatively, the communication module 220 can initiate the self-extracting software package to install within the vehicle 100 and/or configure one or more filters within the vehicle 100 to sniff for the event data 250 and store the event data 250 in a memory (e.g., memory 210) as will be discussed in further detail subsequently.

Furthermore, the collection system 170, in one embodiment, also includes the filter module 230 that generally includes instructions that function to control the processor 110 to collect event data 250 according to the defined parameters. In one embodiment, the filter module 230 configures and monitors multiple filters at different hook points within the vehicle systems 140 and/or sensor systems 120 in order to identify and collect information according to the defined parameters. Thus, the filter module 230 functions to acquire event data 250 that matches the defined parameters while excluding extraneous information that does not match the defined parameters.

Accordingly, in one embodiment, the collection system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes the event data 250 along with, for example, metadata that characterizes various aspects of the event data 250. For example, the metadata can include location coordinates (e.g., longitude and latitude), relative map coordinates, time/date stamps from when the separate event data 250 are collected, and so on.

Figure 3:
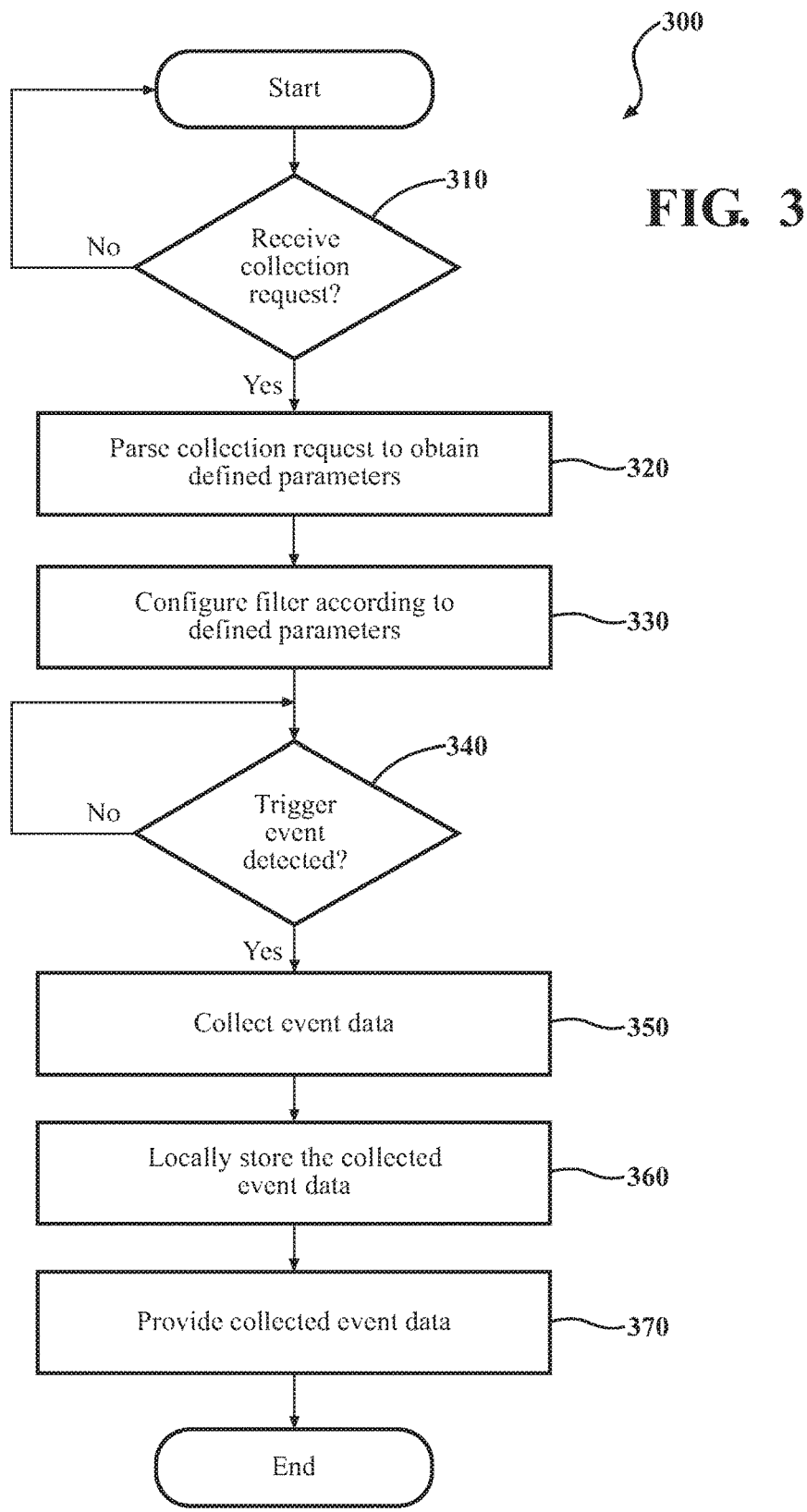
FIG. 3 illustrates one embodiment of a method that is associated with collecting event data according to defined parameters.

Additional aspects of selectively collecting the event data 250 according to remote collection requests will be discussed in relation to FIG. 3. FIG. 3 illustrates a flowchart of a method 300 that is associated with selectively collecting and storing data. Method 300 will be discussed from the perspective of the collection system 170 of FIGS. 1 and 2. While method 300 is discussed in combination with the collection system 170, it should be appreciated that the method 300 is not limited to being implemented within the collection system 170, but is instead one example of a system that may implement the method 300.

At 310, the communication module 220 monitors for a collection request. In one embodiment, the collection request is a communication issued by a remote server for controlling the vehicle 100 to collect particular event data 250. For example, when an original equipment manufacturer (OEM) or other authorized entity wishes to collect information about a particular aspect of the vehicle 100 (e.g., emergency braking events), a collection request can be generated with defined parameters and communicated to at least the vehicle 100 to cause the vehicle 100 to monitor for the prescribed event data 250. Therefore, at 310, the communication module 220 monitors for the collection request by monitoring one or more communication networks (e.g., cellular, wifi, satellite, etc.) in order to identify when the collection request is provided. In further embodiments, the communication module 220 can monitor for the collection request via local ports (e.g., serial ports, USB ports, etc.) of the vehicle 100 as provided through a physical connection.

At 320, the communication module 220 identifies the defined parameters from the collection request. In one embodiment, the communication module 220 parses the collection request to locate and retrieve the defined parameters. For example, the communication module 220 can parse the collection request to identify separate fields from which the communication module 220 can then extract the defined parameters. Alternatively, in an implementation where the collection request includes a software package or a self-extracting code, the communication module 220 can initiate the code to populate one or more filters of the vehicle 100 with the defined parameters and/or to execute on the processor 100 as part of the communication module 220 to monitor for the event data 250.

As indicated previously, the defined parameters can include content parameters, one or more trigger events, and a termination event. In either case, the defined parameters include at least the content parameter that indicates criteria for determining which data associated with the vehicle is to be collected. The content parameters specify sources (e.g., sensors or systems) of the event data 250, logical conditions (e.g., =, >, <, AND, XOR, etc.) for collecting the event data 250, particular types (e.g., velocity, direction, position, etc.) of the event data 250, formatting, and so on.

For example, in a broadest context, the content parameter can indicate to collect all available data from the vehicle 100 when the trigger event occurs. That is, the content parameter can simply specify to collect all data for a particular trigger event. By contrast, when specified in a narrower context, the content parameter can indicate to collect from a particular source (e.g., LIDAR sensor 124), one or more conditions (e.g., a relative location from which data is desired such as in front of the vehicle 100), and other conditions in addition to the occurrence of the trigger event. Thus, the event data 250 that is to be collected can be specified with a specific or general granularity depending on which data is desired.

Additionally, the defined parameters can further specify the trigger event and the termination event. The trigger event is, in one embodiment, an indicator of when to begin collecting the event data 250 according to the conditions specified by the content parameters. Thus, as will be explained further in relation to block 340, the filter module 230 generally monitors one or more streams of data in the vehicle 100 to identify the occurrence of the trigger event. Moreover, the termination event, in one embodiment, specifies conditions used by the filter module 230 to determine when collection of the event data 250 is to cease after an occurrence of the trigger event. Further aspects of the termination event will be discussed in relation to block 370.

At 330, the communication module 220 configures one or more filters of the vehicle 100 with the defined parameters. In one embodiment, the filters are various access points into the vehicle systems 140 and the sensor systems 120. For example, the filters can be application programming interface (API) hooks into various routines executing in the vehicle 100, observation points of one or more data buses, routines that can access register values, and so on. In general, the filters function to access data produced by various systems/sensors of the vehicle 100 and to divert and/or copy the data according to the defined parameters. Thus, in one embodiment, any electronic information produced by or contained within the vehicle 100 can be accessed by the filters for purposes of collection as disclosed herein. Therefore, in an instance when the collection request includes a software package or other code that is to monitor the systems/sensors of the vehicle 100, the filters can be directly controlled by the noted executing code in order to retrieve the event data 250 and/or the executing code can be integrated with the filters to provide access to the data. In either case, the communication module 220 uses the defined parameters from the collection request to configure the vehicle 100 to collect event data 250.

At 340, the filter module 230 monitors for a trigger event. In one embodiment, the trigger event defines a specific event in relation to the vehicle 100 for which data is to be collected. For example, the trigger event may indicate that event data 250 is to be collected whenever a brake pedal of the vehicle 100 is activated to a specified degree and at a certain rate so that emergency braking events can be collected. As a further example, the trigger event can specify a geographic area (e.g., bounding box specified by GPS coordinates), a particular roadway feature (e.g., stop sign, traffic light), a particular relationship with nearby objects (e.g., following another vehicle at certain speed, driving alongside another vehicle), a particular timeframe (e.g., rush hour, night or low-light conditions, etc.), or other conditions. In general, defining the trigger event can encompass any conditions occurring in relation to the vehicle 100 that are detectable by the filter module 230 through available electronic data/signals.

In either case, the filter module 230 monitors for the trigger event by, for example, scanning a data stream for information matching an occurrence of the trigger event. That is, in one embodiment, the filter module 230 monitors one or more data buses, interprocess communications channels, interrupt requests, registers, or other electronic sources to identify data that is indicative of the occurrence of the trigger event. The filter module 230 can continuously monitor for the trigger event and, once detected, can proceed to collect event data 250 as discussed at block 350.

Furthermore, because a timing of when the trigger event will occur is unknown, the filter module 230, in one embodiment, buffers data that matches the content parameter continuously even though the trigger event has not been detected. The filter module 230 continuously buffers the data in order to capture data from a time just before the trigger event. That is, for example, the filter module 230 can cycle data matching the content parameter through an incident buffer. In one embodiment, the filter module 230 stores this preliminary data from the vehicle 100 prior to detection of the trigger event for a defined period of time (e.g., one minute). Accordingly, the incident buffer can be a first-in first-out buffer that releases preliminary data older than the defined period while adding newly detected event data 250. In this way, event data 250 is continuously cycled through the incident buffer and upon detecting the trigger event at 340, event data 250 from before the occurrence of the trigger event is preserved so that a prior state can be reported along with data collected at 350.

At 350, the filter module 230 collects event data 250 from the vehicle 100. In one embodiment, the filter module 230 collects the event data 250 from one or more vehicle systems 140 including the sensor system 120. That is, upon detecting the occurrence of the trigger event, the filter module 230 collects data that matches the content parameters in a log, register, or other temporary storage. By way of example, when the trigger event is defined as an emergency braking event, the content parameter may specify to collect data about a trajectory of the vehicle 100, a location of the vehicle 100, the presence of other vehicles, a current state of the autonomous driving module 160, and so on. Thus, the filter module 230 can collect data from telemetry systems of the vehicle 100 about current accelerator positions, steering wheel angles, data from a GPS about a current location, data from the LIDAR 124 and the radar 123 about nearby objects such as other vehicles, data from the autonomous driving module 160 about current decision and planning states, and so on.

Moreover, in one embodiment, the filter module 230 can activate one or more sensors of the sensor system 120 to acquire additional information that may not otherwise be generated by the vehicle 100. For example, if the camera 126 is not presently active, then the filter module 230 can activate the camera to obtain additional data. Additionally, in an instance when the vehicle 100 is parked and turned off, the filter module 230 may activate a camera to obtain images of any nearby objects and so on. As another example, if the filter module 230 detects a high power draw when the vehicle 100 is in an off state, then the filter module 230 can activate one or more sensors to identify a source of the power draw. Furthermore, nominal data, which is characterized as interprocess communications, routine state information, and/or debugging information can also be collected. As a general matter, in one embodiment, any data that is accessible by the filter module 230 can be collected at 350 so long as the data matches the content parameter.

Additionally, it should be noted that while the filter module 230 is generally discussed as collecting data at 350 by copying or otherwise storing data that matches the content parameters, one aspect of the collecting at 350 is to discard or otherwise not store data that does not match the content parameter. Because storing all available data without regard to whether the data matches the content parameters can overflow allocated storage and/or generally complicate collection of the desired event data 250, extraneous data that does not match the content parameters is discarded or simply ignored. In this way, the filter module 230 can isolate desired data to selectively collect the event data 250 while avoiding collecting excessive information that complicates determining which data is relevant to the collection request.

At 360, the filter module 230 stores the event data 250. In one embodiment, the filter module 230 stores collected event data 250 in a local memory (e.g., memory 210 or database 240). For example, in one embodiment, the filter module 230 can initially store event data in a buffer or temporary register and then transfer the event data 250 to a non-volatile memory to, for example, protect against losing the event data should a power failure occur. Moreover, as part of storing the event data 250 as discussed at block 360, the filter module 230 can format the event data 250 at 360. For example, the filter module 230 can format the event data 250 into a standardized or defined format using XML or another markup language to annotate the event data 250. Additionally, the filter module 230 can compress or otherwise prepare the event data 250 to minimize bandwidth when communicating the collected data 250 subsequently.

At 370, the communication module 220 provides the event data 250 to fulfill the collection request. In one embodiment, the communication module 220 wirelessly communicates the event data 250 using a same connection from which the collection request was received. Thus, the communication module 220 can communicate the event data 250 to the remote server from which the collection request was received.

Additionally, in one embodiment, the communication module 220 communicates the event data 250 according to a termination parameter that specifies when to stop collecting the event data for the trigger event. For example, the communication module 220 can communicate the event data 250 after a period of time designated by the termination parameter, according to a quantity of the event data 250 that has been collected, when a communication connection (e.g., wifi) is available, or according to another suitable termination parameter. In either case, the communication module 220 generally provides the event data 250 to an OEM or other requesting source which, for example, aggregates event data from a plurality of vehicles. Thus, the requesting source can accumulate data that has been collected according to the defined parameters from the plurality of vehicles in order to generate a specific data set to, for example, train a machine learning algorithm or otherwise analyze particular aspects of specific events. Consequently, the specified event data 250 is selectively collected without complications from storing extraneous data.

Figure 4:
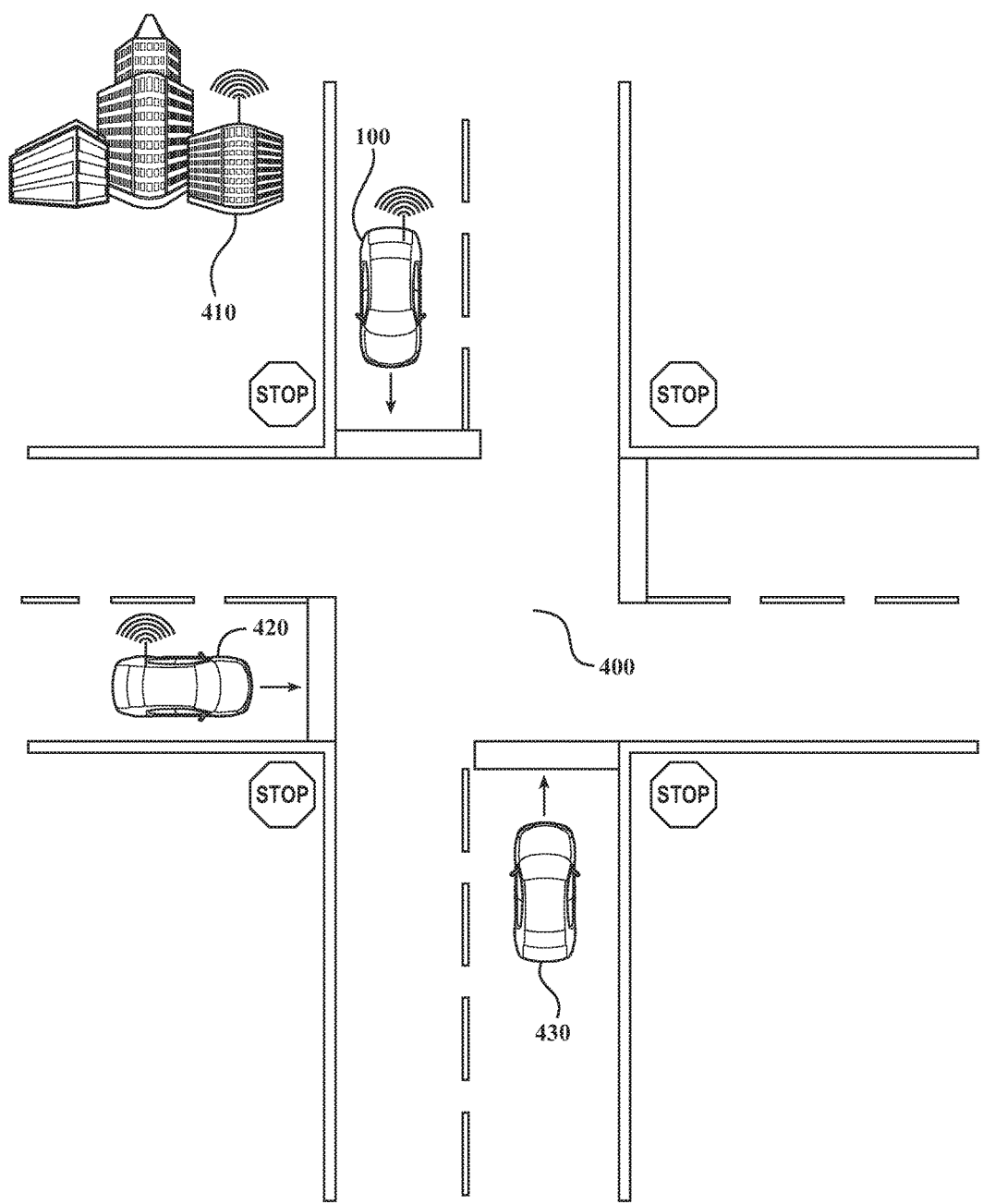
FIG. 4 is a schematic of an example environment in which the disclosed systems and methods may operate.

As a further example, FIG. 4 illustrates a schematic of an intersection 400 that is a four-way stop. As illustrated, a central source 410, which is an OEM or other requesting entity, can provide a collection request wirelessly to the vehicle 100. Moreover, the central source 410 may also provide the same or a similar collection request to vehicles 420 and 430. Thus, the requesting entity 410 can cause a plurality of vehicles to selectively collect event data in order to aggregate information about a particular set of defined parameters instead of, for example, attempting to locate the same event data among a large data set. That is, the collection request provides the entity 410 with a mechanism to acquire targeted data without a need to search through or otherwise delineate a relevancy of data that is mixed together in a large data set.

Moreover, the entity 410 can provide the collection request in different formats according to, in one embodiment, configurations of the particular vehicles. That is, because of differences in capabilities between vehicles as a result of different manufacture dates, different available sensors, different included systems, and so on, the entity 410 can provide the collection request in a form that is suited to the particular vehicle. As one example, the entity can provide a first collection request to the vehicle 420 using a defined XML document format with the defined parameters populating annotated fields. By contrast, the entity 410 can provides a second collection request to the vehicle 430 as a self-extracting segment of code that when executed by the vehicle 430 populates various filters and/or a filter module 230 with the defined parameters. In either case, the collection request is provided by the central entity 410 either directly or through a distributed network of remote servers to inform the various vehicles about which data to collect.

Continuing with the discussion of FIG. 4, when the vehicle 100 receives the collection request, the communication module 220 configures the various filters and other collecting components of the vehicle 100 so that event data is collected according to the collection request. For purposes of illustration, consider that the collection request specifies a trigger event being the vehicle 100 encountering a four-way stop. In various embodiments, the trigger event can be specified in several different ways. For example, the collection request may specify a particular four-way stop (e.g., intersection 400) using GPS coordinates, may specify a set of four-way stops using a list of GPS coordinates, may specify a type of intersection generically, and so on. Moreover, the collection request may specify particular additional attributes as part of the trigger event such as a presence of other vehicles, time of day and so on.

Accordingly, as the vehicle 100 approaches the intersection 400, the filter module 230 detects the intersection 400 using vision, GPS coordinates, or another means. Furthermore, if specified, the filter module 230 can also detect the presence of vehicles 420 and 430 as a factor for determining whether the trigger event is satisfied. Thus, upon the occurrence of the trigger event in relation to the intersection 400, the filter module 230 initiates collection of the event data 250 according to the content parameter. As an example in relation to the intersection 400, the filter module 230 can collect point cloud data from the LIDAR sensor 124 (e.g., object tracks and classifications), radar data from the radar sensor 123, telemetry data, brake pedal data, steering wheel data, accelerator pedal data, and so on. In general, as previously indicated, the data collected by the filter module 230 can be any data that is accessible to the filter module 230 and as specified by the content parameters from the collection request.

In either case, the filter module 230 collects the event data as the vehicle 100 travels through the intersection 400. In one embodiment, the vehicle 100 ceases collecting the event data 250 according to a termination event such as when the vehicle 100 exits an area proximate to the intersection 400. Thereafter, the communication module 220 can communicate the event data 250 back to the central entity 410 using the same connection on which the collection request was received. Alternatively, the vehicle 100 may store the event data 250 until connected via a physical cable, when connected to a home WIFI, until the event data 250 is downloaded to a removable storage device (e.g., flash drive) and so on. In either case, the event data 250 is provided back to a remote server of the entity 410 so that the event data 250 can be further used by the entity 410. In this way, collection of data from an auto is improved to avoid large data sets that include extraneous information.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the collection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the collection system 170, and/or the autonomous driving module(s) 160 may control some or all of these vehicle systems 140 and, thus, may be partially or fully autonomous.

The processor(s) 110, the collection system 170, and/or the autonomous driving module(s) 160 can be operatively connected to communicate with the various vehicle systems 140 and/or individual components thereof. For example, returning to FIG. 1, the processor(s) 110, the collection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the collection system 170, and/or the autonomous driving module(s) 160 may control some or all of these vehicle systems 140.

The processor(s) 110, the collection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the collection system 170, and/or the autonomous driving module(s) 160 can control the direction and/or speed of the vehicle 100. The processor(s) 110, the collection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the collection system 170 can collect data about control signals from the processor 100 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the collection system 170 can be configured to collect information about and/or determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A collection system for collecting information from a vehicle, comprising:
   one or more processors;
   a memory communicably coupled to the one or more processors and storing:
   a communication module including instructions that when executed by the one or more processors cause the one or more processors to, in response to receiving a collection request from a remote server, identify defined parameters from the collection request about which data is to be harvested from the vehicle, wherein the defined parameters include at least a content parameter that indicates criteria for determining which data associated with the vehicle is to be collected; and a filter module including instructions that when executed by the one or more processors cause the one or more processors to collect, from one or more vehicle systems of the vehicle, event data as a function of the content parameter and discarding extraneous data that does not match the content parameter wherein the defined parameters further specify a trigger event that indicates when the event data that matches the content parameter is to be collected, wherein the filter module includes instructions to buffer, in an incident buffer, preliminary data from the vehicle prior to detection of the trigger event for a defined period of time before cycling additional data into the incident buffer, and, wherein the communication module includes instructions to provide the event data to fulfill the collection request.

2. The collection system of claim 1, wherein the filter module further includes instructions to collect the event data by querying one or more sensors of the vehicle to activate and provide data about the trigger event.

3. The collection system of claim 2, wherein the filter module includes instructions to detect the trigger event by monitoring the one or more vehicle systems according to filters that define the trigger event and by scanning a data stream for information matching an occurrence of the trigger event.

4. The collection system of claim 2, wherein the incident buffer is a first-in-first-out buffer, and wherein the filter module further includes instructions to buffer the preliminary data to avoid discarding information associated with the trigger event that occurs prior to the trigger event.

5. The collection system of claim 1, wherein the defined parameters indicate a termination parameter that specifies when to stop collecting the event data for a trigger event, and wherein the termination parameter indicates one or more of:
 (i) a period of time for which to collect the event data, and
 (ii) a quantity of the event data to collect prior to providing the event data.

6. The collection system of claim 1, wherein the communication module further includes instructions to identify the defined parameters by parsing the collection request to retrieve the defined parameters and to configure a filter of the vehicle with the defined parameters.

7. The collection system of claim 1, wherein the filter module further includes instructions to collect the event data by collecting nominal data about processes and communications between processes executing within the one or more vehicle systems, and
 wherein the filter module further includes instructions to collect the event data by storing the event data in a local memory of the vehicle, and wherein the defined parameters are filter controls that comprise a software package.

8. The collection system of claim 1, wherein the communication module further includes instructions to provide the event data by wirelessly communicating the event data to the remote server upon fulfillment of the collection request, and
 wherein the filter module includes instructions to, in response to the collection request, configure and monitor filters at different hook points within the vehicle to collect the event data associated with the content parameters while avoiding collection of unrelated data.

9. A non-transitory computer-readable medium storing instructions that when executed by one or more processors cause the one or more processors to:
 in response to receiving a collection request from a remote server, identify defined parameters from the collection request about which data is to be harvested from a vehicle, wherein the defined parameters include at least a content parameter that indicates criteria for determining which data associated with the vehicle is to be collected;
 collect, from one or more vehicle systems of the vehicle, event data as a function of the content parameter and discarding extraneous data that does not match the content parameter, wherein the defined parameters further specify a trigger event that indicates when the event data that matches the content parameter is to be collected;
 buffer, in an incident buffer, preliminary data from the vehicle prior to detection of the trigger event for a defined period of time before cycling additional data into the incident buffer, and;
 provide the event data to fulfill the collection request.

10. The non-transitory computer-readable medium of claim 9,
 wherein the instructions to collect the event data include instructions to query one or more sensors of the vehicle to activate and provide data about the trigger event.

11. The non-transitory computer-readable medium of claim 10, wherein the instructions to detect the trigger event include instructions to monitor the one or more vehicle systems according to filters that define the trigger event and by scanning a data stream for information matching an occurrence of the trigger event.

12. The non-transitory computer-readable medium of claim 10, wherein the incident buffer is a first-in-first-out buffer,
 and wherein the instructions to buffer the preliminary data avoid discarding information associated with the trigger event that occurs prior to the trigger event.

13. The non-transitory computer-readable medium of claim 9, wherein the instructions to collect the event data include instructions to collect nominal data about processes and communications between processes executing within the one or more vehicle systems, and
 wherein the instructions to collect the event data include instructions to store the event data in a local memory of the vehicle, and wherein the defined parameters are filter controls that comprise a software package.

14. A method of collecting information from a vehicle, comprising:
 in response to receiving a collection request from a remote server, identifying defined parameters from the collection request about which data is to be harvested from the vehicle, wherein the defined parameters include at least a content parameter that indicates criteria for determining which data associated with the vehicle is to be collected;
 collecting, from one or more vehicle systems of the vehicle, event data as a function of the content parameter and discarding extraneous data that does not match the content parameter wherein the defined parameters further specify a trigger event that indicates when the event data that matches the content parameter is to be collected; buffering, in an incident buffer, preliminary data from the vehicle prior to detection of the trigger event and for a defined period of time before cycling additional data into the incident buffer; and providing the event data to fulfill the collection request.

15. The method of claim 14, wherein collecting the event data includes querying one or more sensors of the vehicle to activate and provide data about the trigger event.

16. The method of claim 15, wherein detecting the trigger event includes monitoring the one or more vehicle systems according to filters that define the trigger event by scanning a data stream for information matching an occurrence of the trigger event.

17. The method of claim 15, wherein the incident buffer is a first-in-first-out buffer that stores the preliminary data and, wherein buffering the preliminary data avoids discarding information associated with the trigger event that occurs prior to the trigger event.

18. The method of claim 14, wherein the defined parameters indicate a termination parameter that specifies when to stop collecting the event and data for a trigger event, wherein the termination parameter indicates one or more of:
(i) a period of time for which to collect the event data, and
(ii) a quantity of the event data to collect prior to providing the event data.

19. The method of claim 14, wherein identifying the defined parameters includes parsing the collection request to retrieve the defined parameters and configuring a filter of the vehicle with the defined parameters.

20. The method of claim 14, wherein collecting the event data includes collecting nominal data about processes and communications between processes executing within the one or more vehicle systems,
wherein providing the event data includes communicating the event data to the remote server upon fulfillment of the collection request,
wherein collecting the event data includes storing the event data in a local memory of the vehicle, and wherein the defined parameters are filter controls that comprise a software package.

* * * * *

UNITED STATES PATENT AND TRADEMARK OFFICE
CERTIFICATE OF CORRECTION

Page 1 of 1

PATENT NO.         : 10,210,672 B2
APPLICATION NO.    : 15/481818
DATED              : February 19, 2019
INVENTOR(S)        : Michael R. James and Edwin B. Olson It is certified that error appears in the above-identified patent and that said Letters Patent is hereby corrected as shown below:

In the Specification

Column 15, Line 3: "160 can be configured can" should read --160 can be configured--

In the Claims

Column 17, Line 20: Delete "," after "and"

Column 17, Line 55: Delete "and" after "systems,"

Column 18, Line 1: Delete "with the content" and insert --with the defined content--

Column 18, Line 23: Delete ", and;" after "buffer" and add "; and,"

Column 18, Line 46: Delete "and" after "systems,"

Column 18, Line 63: Add "," after "content parameter"

Column 19, Line 15: Add "," after "data" and Delete "," after "and"

Column 20, Line 1: Add "," after "event,"

Signed and Sealed this
Eighteenth Day of February, 2020

Andrei Iancu
*Director of the United States Patent and Trademark Office*